United States Patent [19]

Ranallo et al.

[11] 3,832,109
[45] Aug. 27, 1974

[54] SPRUE SEALER
[75] Inventors: Henry U. Ranallo, Cleveland; Edward T. LeBreton, Mentor, both of Ohio
[73] Assignee: Structural Fibers, Inc., Chardon, Ohio
[22] Filed: May 10, 1973
[21] Appl. No.: 359,208

[52] U.S. Cl. .......... 425/112, 425/DIG. 19, 425/128, 264/257, 264/314, 425/405 R, 249/144
[51] Int. Cl. ............................................. B29c 1/00
[58] Field of Search...... 425/405 R, 405 H, DIG. 19

[56] References Cited
UNITED STATES PATENTS
2,977,269 3/1961 Nerwick .................... 425/DIG. 19
3,137,898 6/1964 Geringer .................... 425/DIG. 19
3,368,239 2/1968 Wiltshire .................... 425/DIG. 19

Primary Examiner—J. Howard Flint, Jr.
Attorney, Agent, or Firm—McNenny, Farrington Pearne & Gordon

[57] ABSTRACT

A sprue or resin drain closure assembly for use in apparatus employed to mold resin impregnated fiber articles is disclosed. Part of the assembly also serves as a device for removing molded articles from the mold. According to the invention, a stop or anvil is spaced laterally from a closure head, and the head is axially movable toward the stop. Movement of the head toward the stop seals a flexible extension of a sprue insert disposed therebetween. The stop may be pivoted away to permit the removal of the flexible extension from the sprue insert and the connection of a fluid supply thereto for providing a mold removal lifting force on the molded article through the sprue opening.

4 Claims, 5 Drawing Figures

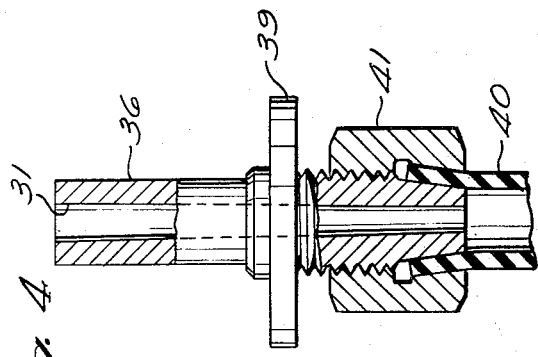
Fig. 4
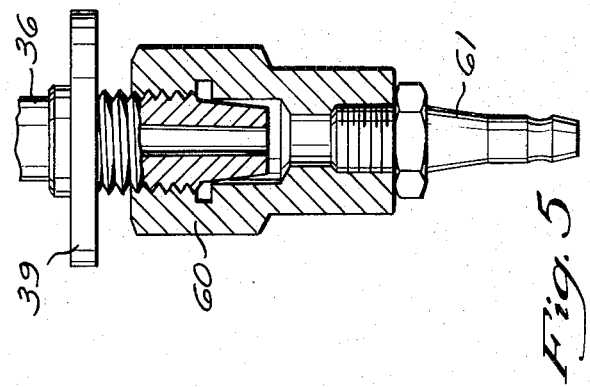
Fig. 5
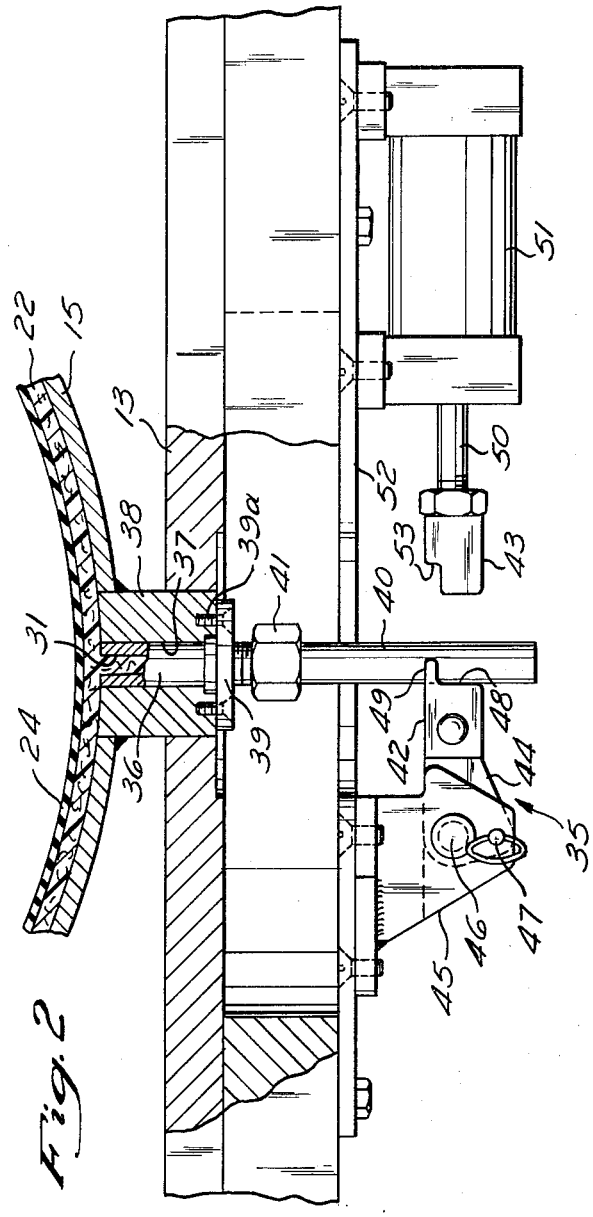
Fig. 2
Fig. 3

SPRUE SEALER

BACKGROUND OF THE INVENTION

This invention relates to apparatus for the manufacture of fiber-reinforced, molded articles generally, and more particularly to apparatus for the closing of sprues on the mold casings of presses that are employed to mold the fiber-reinforced articles. The invention also relates to apparatus for providing a fluid assist to remove the finished articles from the molds.

In molding fiber-reinforced, plastic articles, a molding press of the general type as that disclosed in U.S. Pat. No. 3,368,239 to Wiltshire is used. There have been some developmental changes in the specific press disclosed that will hereafter become apparent from this disclosure. These presses usually have an inner mold wall that generally conforms to the desired outside shape of the molded article. Fiber preforms are laid up against the inner wall of this rigid mold and define the approximate shape of the article to be molded.

An expandable bag-like membrane or envelope is positioned within the fiber preforms and the envelope contacts the preforms upon pressure induced expansion to compress the fiber preforms between itself and the molding surface and to define the shape of the article to be molded.

After the preforms are subjected to moderate pressure by the expanded membrane and are in the approximate shape of the finished article, they are permeated with a thermosetting resin which, in a predetermined amount, enters the preforms and begins forcing displaced air out of a sprue opening in the bottom of the mold casing.

Further compression to the final molding pressure by the inflated envelope forces the resin to permeate the preforms uniformly and force the residual air from the preforms until the resin appears at the sprue opening and begins to flow out of the mold casing. A pin is then inserted or tapped into the sprue opening, preventing a further escape of resin. An example of this type of taper pin used in sprue closing is described in the above-mentioned Wiltshire patent. Subsequent to the sealing of the sprue opening by the taper pin, the mold is heated by pumping steam into jackets in the molding press to cure the resin. When sufficient time for the resin to set has passed, the envelope is deflated and removed. The top end of the mold is then raised by the press, allowing the molded article to be lifted out of the remainder of the mold.

There are some difficulties encountered when the molding process is performed in the manner described above. Some of these difficulties relate to the manner in which the sprue is closed, and others relate to the process of removing the finished article from the press. In closing the sprue by a tapered pin, it is difficult to ensure that the pin will remain in the spure opening. Since the tapered pin is only held in place by the frictional force from wedging the pin in the sprue opening, there is a chance that it may fall out at an inopportune moment if the pin has accidentally accumulated oil, water, or some other lubricant on its surface.

Mechanical wear may also contribute to this detrimental result. If the pin is formed of softer material than the sprue opening, constant wedging will reduce the diameter such that the pin may fall out at any time or be projected too far into the mold cavity. If the casing is manufactured of softer material than the pin, the sprue opening may become larger with increased use and eventually be unable to prevent the pin from falling or be unable to limit pin projection into the mold cavity. Either of these conditions is difficult to recognize before it happens, and may cause wasted time during manufacturing before it is corrected.

Once the resin appears at the sprue opening, any delay in closing the sprue may cause significant amounts of resin to flow out from the mold casing. This is detrimental, since only a predetermined amount of resin is injected into the mold and the loss of a portion of this causes the finished article to be fiber-rich, thereby weakening it. For the product to be uniform and to meet design specifications, the correct amounts of fiber resin mix must be rigidly adhered to. The loss of significant portions of the correct amount of resin would necessitate starting the process cycle again, since it would be extremely difficult to measure the amount lost.

It is necessary, therefore, to provide a means for closing the sprue opening without losing much of the predetermined amount of resin and to prevent sprue from being reopened until the resin has set.

The operator is hampered in sprue closing by the limited clearance between the bottom of the mold casing and the floor. The clearance of the mold casing creates a situation in which the operator must bend over or kneel while reaching under the mold to insert the pin. This leaves him in an awkward position, and without a clear line of sight to the sprue opening, unnecessarily complicating the closing.

The operator, when he kneels or reaches under the mold, may also come into contact with loose glass fibers or resin on the floor or near the mold casing. The glass fibers are irritating to skin, and therefore the operator should wear some protective clothing. The irritating environment and the awkward position from which he must insert the pin because of the relative clearance beneath the mold casing may prove uncomfortable for the operator, thereby making his job somewhat objectionable. The elimination of this manual insertion of a sprue pin would enhance the molding press operator's job and provide a less objectionable environment in which to work.

Further problems exist in removing the molded articles from the casing after the resin has set. The molded articles are rounded at the top with cylindrically shaped sidewalls, and removing a tank of more than a small size is difficult to do by just grasping it from the top and lifting it out of the mold. Prior art methods of removing these molded articles include dismantling a sectioned mold casing from around the cylindrical sidewalls or the injection of air under pressure beneath the bottom end walls of the molded article, producing a pneumatic type lifting effect until enough of the cylindrical sidewall is out of the mold to provide a firm grasping surface. However, the source of fluid pressure requires another opening in the mold casing and complicates the structure. It is also necessary to keep the resin from clogging the fluid pressure passage before it has set.

SUMMARY OF THE INVENTION

This invention overcomes the foregoing prior art problems by providing an arrangement for closing the sprue openings of molding apparatus. The closure is performed automatically by a cylinder which moves a closure head laterally against a flexible extension of a sprue insert to pinch the extension against a closure stop. This pinching action effectively seals the sprue opening, since the inner portion of the flexible extension communicates with the inner bore of a sprue insert. The head quickly seals the sprue opening to minimize resin loss, and the positive force of the cylinder piston assures that the sprue will remain closed.

The invention thereby frees the operator from the tedious and time-consuming operation of inserting a taper pin. He can control the closure operation at some distance from the sprue opening and he can also operate more than one apparatus at a time. The closure apparatus frees the operator from performing a tedious pin insertion operation which takes place within the limited clearance space under the press. By employing a standard automatic device to sense resin flow at the sprue opening an operator would be relieved of sprue closing altogether.

Another object of the invention is to provide an improved method and apparatus for the removal of the molded, resin impregnated fiber article after the resin has set. The top of the mold casing is removed or opened, exposing the rounded top of the molded article, and air is blown along the sides of the mold to loosen the article. The flexible extension coupled to the mold casing insert is removed and is replaced by a coupling adapted to be connected to a standard snap fitting air hose. An air line is then connected to supply fluid pressure to the bottom of the molded article which is thereby moved in a vertical direction along the mold's central axis.

BRIEF DESCRIPTION OF THE DRAWINGS

FIG. 2 is an elevational view, partly in section, of a sprue closing assembly employed in combination with the molding apparatus of FIG. 1;

FIG. 3 is a bottom view of the apparatus illustrated in FIG. 2;

FIG. 4 is a partially sectioned view of a mold casing insert, showing a coupling with a flexible extension attached thereto; and FIG. 5 is a partially sectioned view of the mold casing insert, showing an air coupling attached thereto.

DETAILED DESCRIPTION OF THE DRAWINGS

Figure 1:
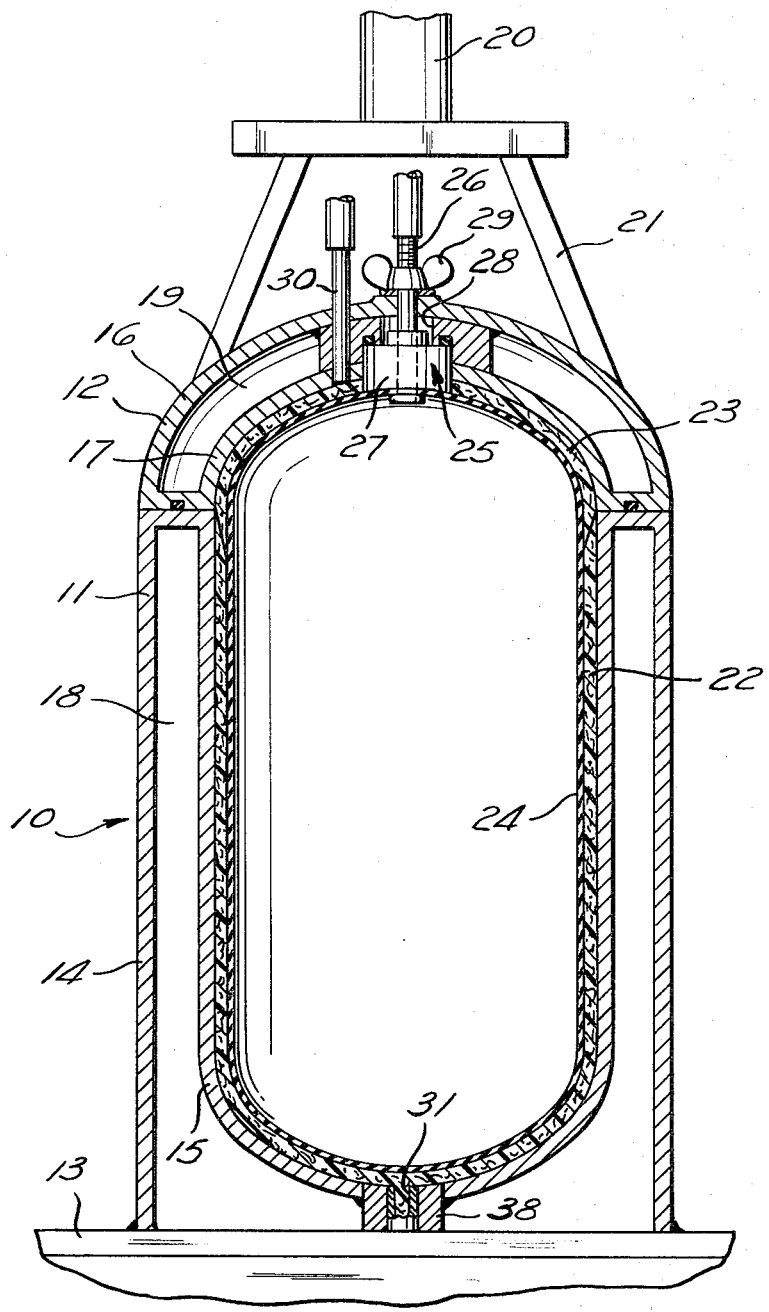
FIG. 1 is a fragmentary side elevational view, partly in section, of a molding apparatus illustrating the principles of this invention.

Referring now to the drawings and particularly to FIG. 1, a mold press 10 is illustrated. The mold press 10 is a modified version of the press shown in U.S. Pat. No. 3,368,239 and includes a sidewall bottom mold casing 11 and a cooperating mold casing cap 12. The mold casing 11 is mounted on a base 13 and includes an outer jacket 14 and an inner mold wall jacket 15. The casing cap 12 includes an outer jacket 16 and an inner jacket 17. Steam chambers 18 and 19 are respectively defined by the mold jackets 14 and 15, and 16 and 17. The casing cap 12 is removably positioned on the mold casing 11 and is adapted for axial translation by a power ram 20 associated with a spider frame 21 which is fixed to the mold casing cap 12. The inner surface of the jackets 15 and 17 cooperate to define a mold cavity which corresponds to the desired external configuration of the article to be molded therein.

In order to manufacture a fiber-reinforced, molded resin tank, the mold casing cap 12 is raised from its illustrated position and a fibrous preform 22 which defines the sidewall and bottom of the article to be molded is inserted in the mold casing 11. The preform 22 is preferably of the type shown in U.S. Pat. No. 3,654,002 and includes a tubular portion and an integrally formed end wall at one end. The wall of the preform consists of a mat formed by a multitude of short lengths of fibers randomly oriented in the wall and bonded by a settable resin which does not fill the voids between the fibers. The form is free of overlaps and seams.

The mold casing cap 12 is provided with an assembly which includes a dome-shaped preform 23, an inflatable, flexible bag or envelope comprising a rubber bag 24, and a clamping structure 25. As is more fully set forth in U.S. Pat. No. 3,368,239, the bag is encased in a protective sheath (not shown) of polyvinyl alcohol film or polyester film, or similar materials which will protect the molding materials against chemical action of vulcanizing agents or residues thereof associated with the bag 24. The bag 24 and protective sheath are connected to a threaded fluid conduit 26 by the clamping structure 25. The clamping structure 25 serves to position the preform 23 axially in its mold cavity and includes a lightweight metal core 27 which is slidably received on the conduit 26 above the bag 24. As shown, the core 27 is in the form of a generally cylindrical body having an axially extending upper neck portion. The neck portion has an outer diameter such that it may be fitted within an axial bore 28 of the casing cap 12. The core 27 has an axial bore (not shown) which is slightly larger than the fluid conduit 26 of the bag 24. A wing nut 29 on the conduit 26 securely clamps the assembly, which includes the bag 24, the core 27, and the conduit 26, securely to the casing cap 12.

With the assembly in the condition in FIG. 1, the conduit 26 is then connected to a suitable air pressure source (not shown) and the bag is inflated until it assumes its illustrated shape. This holds the fiber matting forms against relative shifting while a conventional catalyzed liquid resin, settable by heat, is introduced through a supply line 30 in a measured amount. The amount of resin introduced is such that the charge will permeate the entire fiber lining in the mold during a subsequent pressurizing operation and, preferably, a slight excess of resin is provided so that the progressing column in the fiber matting will drive out all of the air. Excess air is forced out of the mold through a sprue 31. After the measured amount of resin has been introduced, the pressure in the bag 24 is gradually increased to a required maximum molding pressure. When the excess of resin has been forced downwardly through the sprue 31, the sprue 31 is closed in a manner which will hereinafter be explained, and steam at a temperature of between 215°F. and 220°F. is introduced to the chambers 18 and 19 to thereby set the resin.

Referring to FIGS. 2 through 5, a device for closing the sprue 31 when excess resin flows therethrough is illustrated. The device includes a sprue closing apparatus 35 which is mounted beneath the base 13. The sprue closing apparatus 35 includes a mold casing insert 36 having an axial bore therein which defines the sprue 31. The insert 36 is positioned within a bore 37 formed through a plug 38 which is welded in an opening in the jacket 15. A flange 39 is fixed to the end of the plug 38 which projects through the base 13 by screws 39a.

As may be seen most clearly in FIG. 4, the insert 36 is provided with a flexible extension or hose 40 fixed to the end of the insert by a compression coupling assembly which includes a compression nut 41 threaded onto the end of the insert 36. The hose 40 is adapted to be pinched closed by an assembly which includes an anvil block 42 and a closure head 43. As may be seen in FIG. 3, the anvil block 42 is provided with a rearwardly projecting portion 44 which is pivotally connected to a clevis 45 by a pin 46. The anvil block 42 is locked in its illustrated position by a removable pin 47 which projects through the clevis 45 and the rearwardly extending portion 44. The anvil block 42 has a face 48 abutting the hose 40 and projecting fingers 49 which straddle the hose. Operatively associated with the closure head 43 is a ram 50 of a double-acting cylinder 51. The assembly which comprises the head 43, the ram 50, and the cylinder 51 is fastened to a plate 52 which in turn is attached to the bed 13. Similarly, the clevis 45 and its associated mechanisms are fastened to the plate 52. When the cylinder 51 is actuated, the closure head 43 is driven toward the anvil block 42 and the hose 40 is pinched therebetween. The fingers 49 enter a recess 53 in the block 43 to minimize any tendency of the hose 40 to slip from its illustrated position when the cylinder is operated.

In operation, and with the elements in the condition illustrated in FIG. 1, a predetermined amount of resin is injected through the inlet conduit 30 to permeate the glass fiber preforms within the mold. The envelope 24 is then further inflated and displaced air is vented through the sprue 31 as the resin permeates down through the fiber preforms. When the resin reaches the bottom of the mold casing, it begins to flow through the sprue 31 and into the flexible tubular extension 40 coupled thereto. The operator waits until he sees the resin begin to flow from the end of the extension and then activates a control (not shown) to operate the cylinder 51. This action causes the head 43 to engage the extension 40, thus pinching the extension against the anvil 42 to effectively seal the passage defined by the extension. If desired, a conventional sensing device may be provided to sense resin flow from the extension and to operate the cylinder in response to resin flow.

Steam is then admitted into the chambers 18 and 19 through passageways (not shown) to cure the resin. The piston 50 is then retracted and the pin 47 is removed to permit the anvil 42 to swing downwardly away from the extension 40. The extension 40 is removed from the threaded end of the insert 36 together with the compression nut 41. If resin solidifies within the sprue 31, this passageway may be cleared by drilling the resin up to the contour of the molded article.

A coupling 60 having an air valve 61 at one end thereof is threaded onto the insert 36 and, after removal of the mold cap 12 together with the envelope 24, an air hose is connected to the valve 61 to apply fluid pressure to the bottom surface of the molded article. Prior to this operation, it may be necessary to loosen the article from the mold sidewalls by blowing air between the sidewall of the mold and the molded article. By admitting air through the sprue 31, the article is thereby forced upwardly so that the operator may grasp its sidewall.

The invention is not restricted to the slavish imitation of each and every detail set forth above. Obviously, devices may be provided which change, eliminate, or add certain specific details without departing from the scope of the invention.

What is claimed is:

1. In a molding press, for producing molded, fiber-reinforced resin articles, comprising:
    a. a mold having an inner mold cavity wall defining the outside shape of the molded article;
    b. a flexible envelope within said cavity defining the inside shape of the mold articles and adapted to apply molding pressure to said articles during a molding operation;
    c. a resin inlet through said mold wall; and
    d. a sprue opening through said mold wall; the improvement comprising a flexible tubular extension fixed to said sprue opening and in fluid communication therewith, and compression means for deforming and closing said flexible extension to thereby close said spure opening.

2. The improvement according to claim 1 wherein said compression means includes an anvil having a face adjacent to a portion of the extension to be deformed and closed, a closure head of the other side of said tubular extension and spaced laterally from said head, and power means operable to laterally force said closure head into said other side of said tubular extension while the opposite side of said tubular extension is held stationary by said anvil, causing the collapse of the inner bore of said extension.

3. The improvement according to claim 2 wherein said power means comprises a fluid operated piston.

4. The improvement according to claim 3 wherein said anvil has a face abutting said extension and wherein said face has projecting fingers straddling said tubular extension to prevent deflection of the extension upon compression by said closure head.

* * * * *